INVENTOR.
ROBERT E. EISELE
BY John W. Michael
ATTORNEY

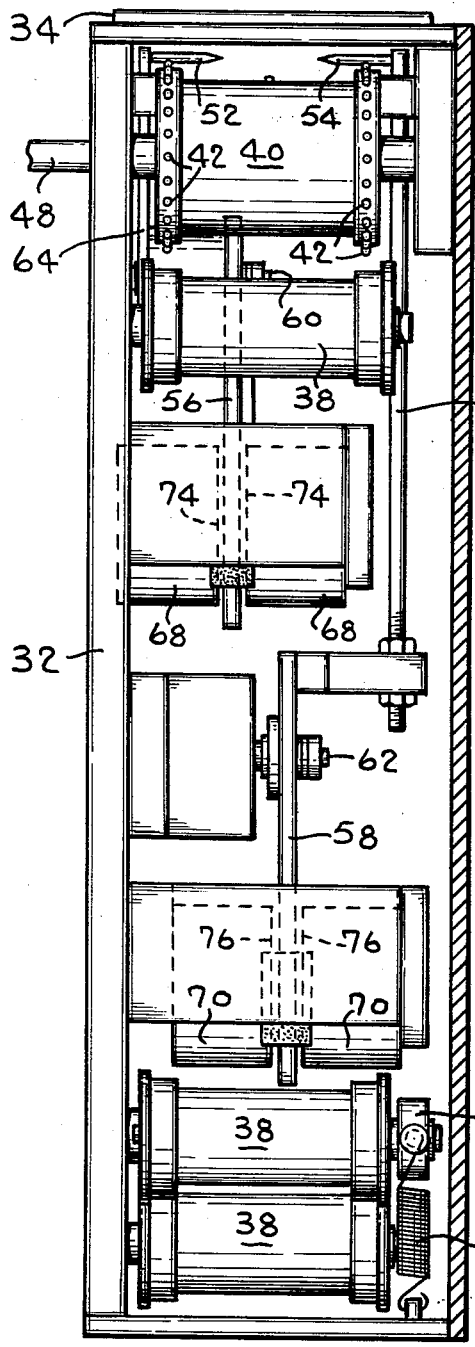
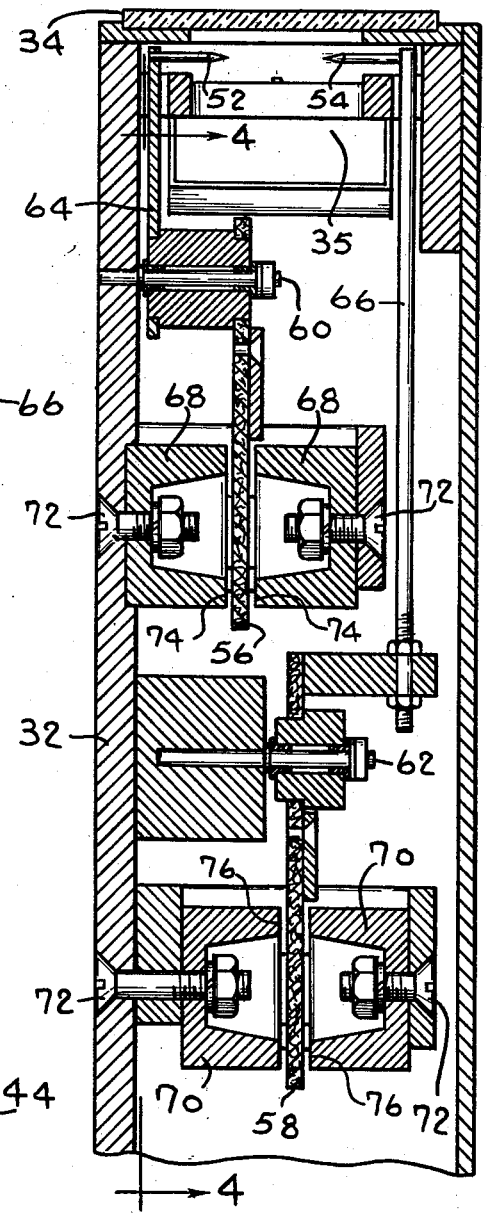
FIG. 2
FIG. 3
INVENTOR.
ROBERT L. EISELE
BY John W. Michael
ATTORNEY Oct. 22, 1963  R. L. EISELE  3,107,796
LOAD POSITION INDICATING DEVICE FOR A CARGO HANDLING APPARATUS
Filed Oct. 16, 1961  4 Sheets-Sheet 3

INVENTOR.
ROBERT L. EISELE
BY John W. Michael
ATTORNEY

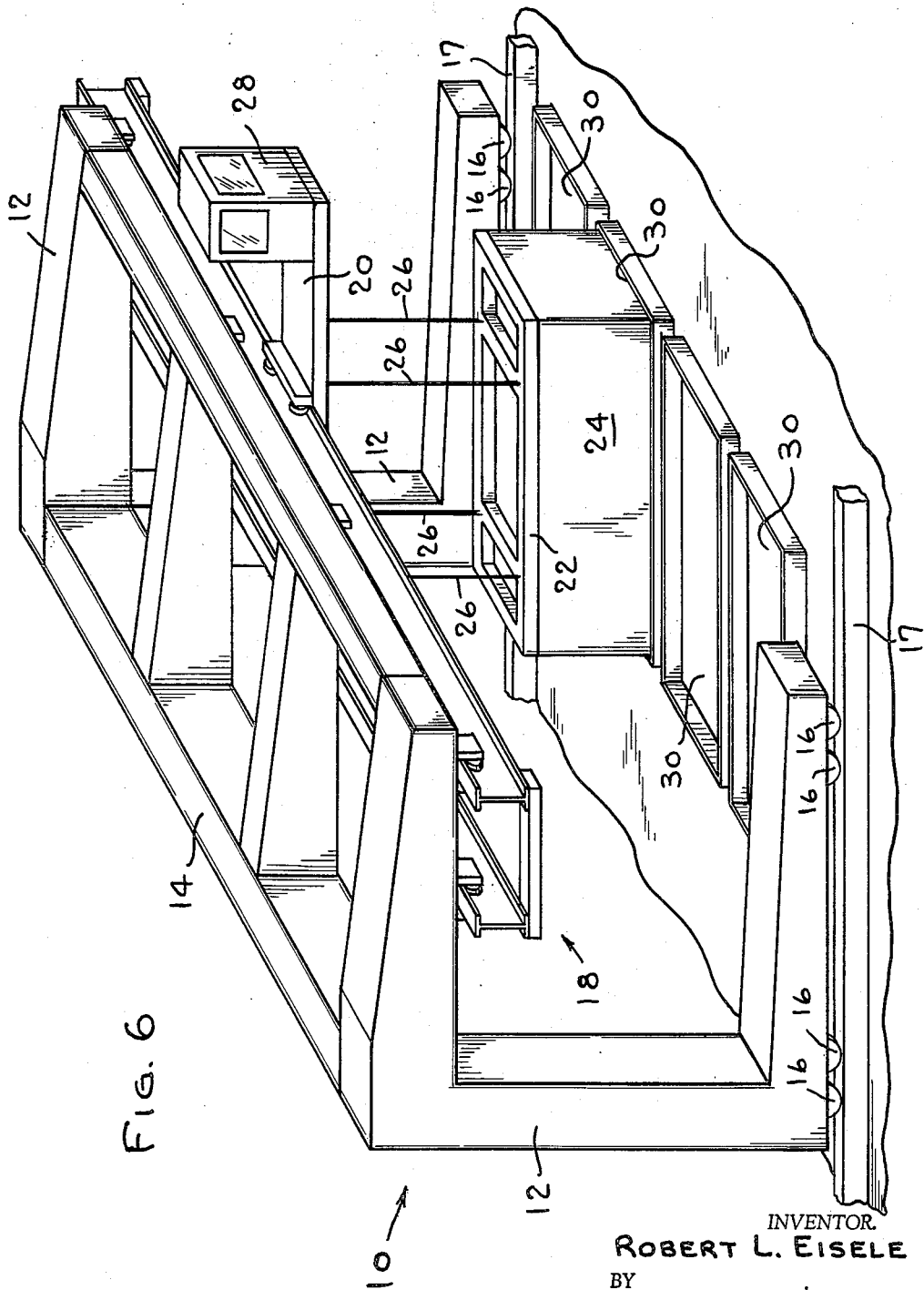

United States Patent Office 3,107,796
Patented Oct. 22, 1963

1

3,107,796
LOAD POSITION INDICATING DEVICE FOR
A CARGO HANDLING APPARATUS
Robert L. Eisele, Kingsford, Mich., assignor to Lake
Shore Inc., Iron Mountain, Mich., a corporation of
Michigan
Filed Oct. 16, 1961, Ser. No. 145,280
10 Claims. (Cl. 214—15)

This invention relates to a load position indicating device for a cargo handling apparatus particularly designed for loading and unloading "containerized cargo" from a ship.

The "containerized cargo" method of shipment involves the use of large (usually rectangularly shaped) containers in which cargo is placed for shipment by ship and/or other means of transportation. Due to the size and bulk of the containers there is generally very little clearance at the ship's hatch requiring the provision of guide members built into the hull to guide the containers as they are loaded and unloaded to and from the hold through the hatches. It is important, therefore, that some means be provided to enable the operator of the ship's cargo handling apparatus to accurately position a loaded container for lowering into the hold. It is an object of this invention, therefore, to provide a position indicating device of relatively simple design which will perform its intended function accurately even on ships haivng irregularly spaced hatches.

A further complicating factor involved in accurately positioning the load with respect to the hatch is caused by the list or sideward tilting of the vessel which, without some means of correction, will result in misalignment between the container and the hatch guides. It is a further object of this invention, therefore, to provide a position indicating device adapted to sense and compensate for the list to insure accurate alignment of container and hatch under all conditions of sidewise tilting of the vessel and irrespective of whether or not a container is supported from the overdeck crane.

The load position indicator of this invention is specially designed for use with a ship's cargo handling apparatus having a load trolley movably mounted on a boom for athwartship movement over the deck of the ship. The indicating device includes a spool means driven in response to movement of the load trolley on the boom and an endless indicator tape threaded around the spool means and in driven engagement therewith. The indicator tape has markings thereon corresponding to the athwartship spacing of the hatches in the deck of the ship. A pointer means is mounted adjacent the tape and adapted for cooperation with the tape to indicate the position of the trolley with respect to the hatches in the deck of the ship.

To correct for list of the ship a list correction means for the pointer means is provided. Such list correction means includes a pendulum mounted for movement in response to list with the pendulum being operatively connected to the pointer means to provide a corrective movement thereto. The pendulum is adapted to sense list of the ship and to move the pointer with respect to the tape, such movement being in proportion to the degree of list and in a direction to compensate for the error in indication which would otherwise occur.

One refinement of the invention involves a damping means for the pendulum to rapidly damp its oscillation. In the preferred embodiment, such damping means includes a permanent magnet mounted adjacent the pendulum.

A further refinement involves the use of a pair of pointers each operatively connected to a separate and independent pendulum to compensate for variation in load offset due to list when there is a container suspended from the load carrying spreader as opposed to when there is no container carried by the load carrying spreader. By varying the respective lengths of the two pendulums, the amount of correction for any given degree of list can be varied to thereby provide a different amount of correction to the two pointers.

Other objects and advantages may be pointed out in or be apparent from the specification and claims, as will obvious modifications of the single embodiment shown in the drawings, in which:

FIG. 2 is a vertical sectional view taken along line 2—2 of FIG. 1;

FIG. 3 is a fragmentary vertical sectional view taken along line 3—3 of FIG. 1;

FIG. 6 is a partially schematic fragmentary view of a cargo handling apparatus for a ship of the type on which the load position indicating device of this invention could be installed.

Figure 1:
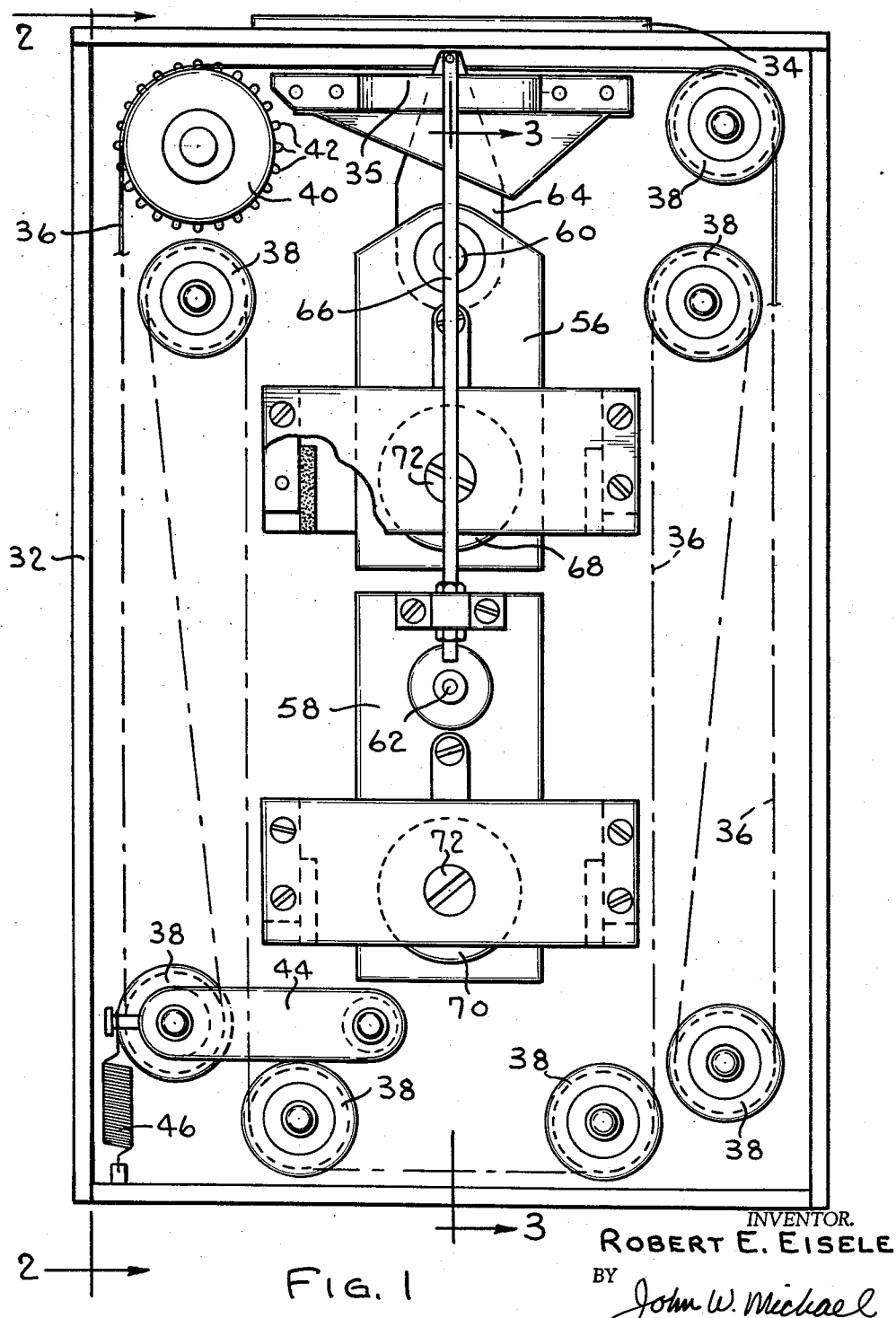
FIG. 1 is a side elevation view of a load position indicating device embodying the present invention with one side of the container removed to expose the working parts therein.
Figure 4:
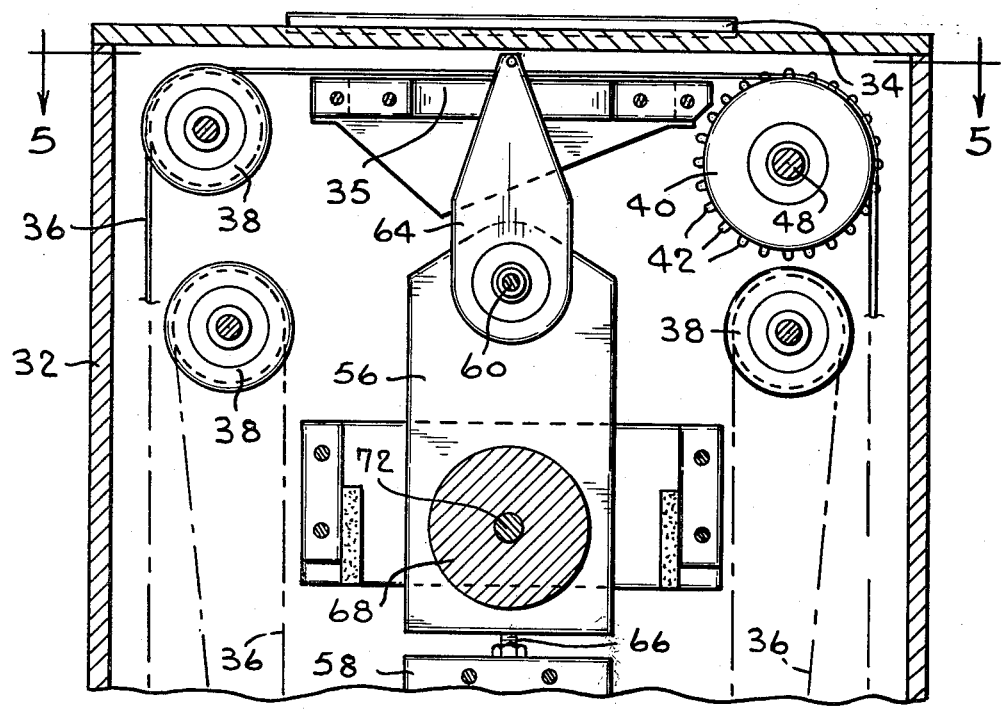
FIG. 4 is a fragmentary vertical sectional view taken along line 4—4 of FIG. 3.

Referring to the drawings, FIG. 6 shows a partially schematic arrangement of a cargo handling apparatus of the type on which the load position indicating device of this invention could be installed. The overdeck crane shown in FIG. 6 is of the type shown and described in greater detail in copending application Serial No. 44,607, assigned to the assignee of this application. Such overdeck crane includes a gantry frame 10 comprising a pair of C-shaped end members 12, 12 interconnected by cross supports 14, 14 as shown. Gantry frame 10 is mounted for fore and aft movement on the deck of a ship by means of wheels 16 running on suitable tracks 17.

A boom 18 is slidably supported on the underside of the upper portion of frame 10 for athwartship movement outboard on either side of the ship. A load trolley 20 having a container carrying spreader 22 supported therefrom is mounted on boom 18 for athwartship movement along the boom. Spreader 22 is adapted for detachable attachment to a cargo container 24 (boxcar, truck body, etc.) and is hoisted and lowered to and from trolley 20 by hoist cables 26. A hoist motor and drum (not shown) for raising and lowering spreader 22 and a haulage motor drive (not shown) for racking boom 18 and driving trolley 20 along the boom are all of conventional design and can be mounted on the gantry. A suitable drive means (not shown) for moving gantry frame 10 fore and aft on the ship's deck can be mounted on the gantry or deck as desired.

An operator's cab 28 is mounted on load trolley 20 opposite the open sides of C-shaped end members 12, 12 as shown.

In operation, boom 18 is extending outwardly from one edge of the ship or the other depending on how the ship is docked. Load trolley 20 from which spreader 22 is supported is driven along the boom to carry a container 24 from the dock to one of the several hatches 30 in the ship's deck through which the container is then lowered for stowage in the ship's hold. The device of this invention serves as an indicator to the operator in cab 28 to enable him to accurately position a container 24 (or the spreader alone) with respect to a hatch 30 so that the container can be lowered into and hoisted from the hold without interference with the hatch opening.

A load positioning device embodying this invention is shown in FIGS. 1-5 and will now be described.

Figure 5:
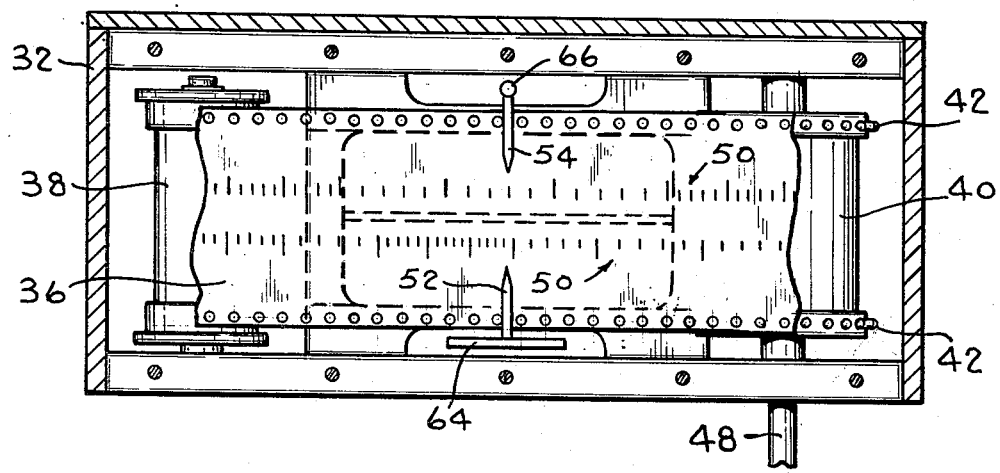
FIG. 5 is a horizontal sectional view taken along line 5—5 of FIG. 4.

The device is located in the operator's cab 28 and includes a container 32 having a double viewing window 34 located on the top thereof through which an indicator tape 36 (shown partially) is viewed from above by the operator. Tape 36 is of the endless type and is threaded back and forth around a series of idler spools 38 and a driver spool 40, as shown in FIG. 1. The tape is driven past viewing window 34 across a viewing panel 35 by driver spool 40 which is provided with teeth 42 which register with a row of properly spaced apertures in the tape (FIG. 5). One of the idler spools (lower left as shown in FIG. 1) is pivotally mounted on an arm 44 biased by a spring 46 as shown to maintain tape 36 taut on the spools during operation of the device.

Driver spool 40 has a drive shaft 48 driven by any suitable means which is synchronized with the athwartship movement of load trolley 20 as it is translated on boom 18 over the deck of the ship. For example, the driver spool 40 could be geared directly to the load trolley drive motor or it could be driven by a separate drive motor synchronized by proper electrical control to the movement of the load trolley. The particular drive arrangement for spool 40 is not a part of this invention it being only necessary that the rotation of spool 40 be accurately synchronized with the movement of load trolley 20.

By properly indexing tape 36 with suitable markings 50 (FIG. 5) the operator in cab 28 can tell exactly when a container 24 supported from load trolley 20 moves into vertical alignment with each hatch 30. This is done by observing tape 36 as it passes over panel 35 past pointers 52 and 54 which, together with markings 50 on the tape, serve to indicate the position of the load with respect to the hatches in the deck. If the hatches are irregularly spaced from one side of the ship to the other the index markings 50 on tape 36 can be correspondingly spaced to insure accurate indication no matter what hatch spacing arrangement is encountered.

It will be appreciated that as a ship tilts or lists during loading or unloading, as is often the case, the athwartship relationship of a container 24 with respect to the deck will vary for any given position of the load trolley on the boom. This is due to the fact that the overdeck gear is rigidly mounted on the deck while the load suspended therefrom is free to hang "vertically" with respect to the center of the earth under the force of gravity. Thus, if the tape gives an accurate indication when the ship is level there will be error introduced into the system when the ship lists to either side.

To compensate for such error and thereby insure accurate indications under all conditions a list correction means is provided for the indicator pointers 52 and 54. Such correction means is adapted to provide an automatic adjusting movement to the pointers with respect to tape 36 in response to list of the ship, such movement being in proportion to the degree of list and in a direction to compensate for the error in indication which would otherwise occur. It is noted at this point that a pair of pointers 52 and 54 are provided. The reason for the double pointer arrangement will be explained in detail hereinafter. The automatic correction feature is provided by mounting pointers 52 and 54 on pendulums 56 and 58, respectively. Pendulums 56, 58 are freely supported in housing 32 beneath window 34 on pivots 60 and 62, respectively, with the pointers attached to extending portions 64 and 66 on the pendulums which extend upwardly from the pivots so that as the pendulums swing in one direction the pointers will be moved in the opposite direction. The device is positioned in cab 28 with the pivotal axes of the pendulums extending in a fore and aft direction so that the pendulums will be sensitive to sidewise list of the ship. Thus, when the ship lists to starboard, for example, pendulums 56, 58 will swing slightly in the same direction causing pointers 52, 54 to move slightly to port with respect to tape 36 and thereby correct for the list.

To illustrate how such correction is made, assume for example that the device, as shown in FIG. 1, is being viewed from the stern side looking forward. With such relationship established, driver spool 40 will be operatively synchronized with the load trolley so that the spool will be driven clockwise as the load trolley 20 is translated athwartship from port to starboard and counterclockwise when the load trolley moves in the opposite direction. Assume now that the ship is listing to starboard. This will cause a load suspended from the load trolley to swing to starboard from an even keel position. Thus, without any means for correction, the indicator tape will indicate perfect alignment of load and hatch when actually the load is offset slightly in the starboard direction from the hatch. Such error is corrected, however, by the pendulums which will swing slightly to starboard as the ship lists in that direction. This movement of the pendulums will cause pointers 52, 54 to move slightly in the opposite (or port) direction with respect to tape 36 and thereby provide a corrective movement to the pointer to compensate for the error which would otherwise occur.

The reason for the double viewing window and pair of pendulums 56 and 58 is to compensate for variation in load offset due to list when there is a container suspended from the spreader as opposed to when there is no container carried by the spreader. Obviously, the amount of error requiring correction is greater with no container suspended from the spreader than is the case with a container attached. This is due to the longer length of hoist cable suspended from the load trolley when there is no container attached to the spreader which would be the case, for example, when the spreader was to be properly positioned for lowering into a hold for unloading a container. Since pointer 54 is mounted on a longer extension arm 66 than is pointer 52, the former pointer 54 will move further for a given amount of list than will pointer 52. Thus, pointer 54 will be the pointer which the operator will consult when there is no container attached to the spreader. Pointer 52, of course, will indicate the location of the load when a container is attached. By the use of suitable electrical interlocks, the proper half of panel 35 can be lighted depending upon the presence or absence of a container on the spreader to thereby indicate to the operator which pointer he should be watching.

A further problem related to this invention is the fact that as the load trolley 20 accelerates and decelerates as it is driven athwartship on the boom 18, pendulums 56 and 58 will begin to oscillate and require considerable time to become stationary. This problem has been solved in the present device by providing a damping means for each of the pendulums adapted to damp out this undesirable oscillation. The preferred means for damping includes pairs of permanent magnets 68, 70 mounted on either side of each pendulum by means of bolts 72 (FIG. 3). The pole faces 74, 76 of magnets 68, 70 are positioned in juxtaposition to each other on either side of pendulums 56, 58 so that as the pendulums swing they will pass between the pole faces. Pendulums 56, 58 are made from a low resistance material such as copper or aluminum. Thus, as the pendulums oscillate through the magnetic fields set up by the magnets 68, 70, such oscillation will be very rapidly damped out. The faster the low resistance material attempts to move through the eddy current field, the more restraint is set up. It has been found that pendulums set up on very fine bearings will damp out completely in about two seconds, whereas the same pendulum will oscillate for about thirty seconds with the magnets removed.

Although but one embodiment of the present invention has been illustrated and described, it will be apparent to those skilled in the art that various changes and modifications may be made therein without departing from the spirit of the invention or from the scope of the appended claims.

I claim:

1. A load position indicator for a ship's cargo handling apparatus having a load trolley movably mounted on a boom for athwartship movement over the deck of the ship comprising, spool means driven in response to movement of the load trolley on the boom, an indicator tape mounted on said spool means and in driven engagement therewith, said tape having markings thereon corresponding to various predetermined positions of the trolley on the boom, a pointer means mounted adjacent said tape and adapted for cooperation with said tape to indicate the position of the trolley on the boom, and a list correction means for said pointer means adapted to sense list of the ship and to move said pointer means with respect to said tape, such movement being in proportion to the degree of list and in a direction to compensate for the error in indication which would otherwise occur.

2. A load position indicator according to claim 1 in which said list correction means includes a pendulum mounted for movement in response to list, said pendulum being operatively connected to said pointer means to provide a corrective movement to said pointer means.

3. A load position indicator according to claim 2 in which said list correction means further includes a damping means for said pendulum to rapidly damp its oscillation, said damping means including a permanent magnet mounted adjacent said pendulum.

4. A load position indicator for a ship's cargo handling apparatus having a load trolley movably mounted on a boom for athwartship movement over the deck of the ship comprising, spool means driven in response to movement of the load trolley on the boom, an indicator tape mounted on said spool means and in driven engagement therewith, said tape having markings thereon corresponding to various predetermined positions of the trolley on the boom, a pointer means mounted adjacent said tape and adapted for cooperation with said tape to indicate the position of the trolley on the boom, and a list correction means for said pointer means adapted to sense list of the ship and to move said pointer means with respect to said tape, such movement being in proportion to the degree of list and in a direction to compensate for the error in indication which would otherwise occur, said pointer means including a pair of pointers, one of which is adapted to indicate the location of the load trolley on the boom when a container is supported therefrom and the other of which is adapted to indicate the position of the load trolley on the boom when there is no container supported from the load trolley.

5. A load position indicator according to claim 4 in which said list correction means includes a pair of pendulums mounted for movement in response to list, said pendulums being operatively and independently connected to each of said pointers to produce a corrective movement to said pointers, the pendulum connected to the pointer which indicates load position when a container is supported from the load trolley being shorter, than the pendulum connected to the pointer which indicates a load position with no container supported from the load trolley.

6. A load position indicator according to claim 5 in which said list correction means further includes a damping means for said pendulums to rapidly damp their oscillations, said damping means including a permanent magnet mounted adjacent each of said pendulums.

7. A load position indicator for a ship's cargo handling apparatus having a load trolley movably mounted on a boom for athwartship movement over the deck of a ship comprising, an indicator pointer means, an indicator tape mounted for movement with respect to said pointer means, said indicator tape driven in response to movement of the load trolley on the boom and having markings thereon corresponding to various predetermined positions of the trolley on the boom, and list correction means for said pointer means adapted to sense list of the ship and to move said pointer means with respect to said tape, such movement being in proportion to the degree of list and in a direction to compensate for the error in indication which would otherwise occur.

8. A load position indicator according to claim 7 in which said list correction means includes a pendulum mounted for movement in response to list, said pendulum being operatively connected to said pointer means to provide a corrective movement to said pointer means.

9. A load position indicator according to claim 8 in which said list correction means further includes a damping means for said pendulum to rapidly lamp its oscillations, said damping means including a permanent magnet mounted adjacent said pendulum.

10. A load position indicator for a ship's cargo handling apparatus having a load trolley movably mounted on a boom for athwartship movement over the deck of a ship comprising, a pointer means, an indicator means mounted for movement with respect to said pointer means, said indicator means driven in response to movement of the load trolley on the boom and having markings thereon corresponding to various predetermined positions of the trolley on the boom, and a list correction means for said pointer means adapted to sense list of the ship and to move said pointer means with respect to said indicator means, such movement being in proportion of degree of list and in a direction to compensate for the error in indication which would otherwise occur.

References Cited in the file of this patent

UNITED STATES PATENTS

| | | |
|---|---|---|
| 1,198,414 | Callan | Sept. 19, 1916 |
| 2,477,673 | Weisman | Aug. 2, 1949 |
| 2,819,802 | Hart | Jan. 14, 1958 |
| 3,042,227 | Tantlinger | July 3, 1962 |